(12) United States Patent
Waldmann

(10) Patent No.: US 7,357,542 B2
(45) Date of Patent: Apr. 15, 2008

(54) OUTSIDE REAR VIEW MIRROR

(75) Inventor: Bernd Waldmann, Nürtingen (DE)

(73) Assignee: Schefenacker Vision Systems Germany GmbH, Schwaikheim (DE)

( * ) Notice: Subject to any disclaimer, the term of this patent is extended or adjusted under 35 U.S.C. 154(b) by 0 days.

(21) Appl. No.: 11/378,887

(22) Filed: Mar. 17, 2006

(65) Prior Publication Data

US 2006/0210236 A1    Sep. 21, 2006

(30) Foreign Application Priority Data

Mar. 18, 2005    (DE) .................... 10 2005 013 682

(51) Int. Cl.
*B60Q 1/26* (2006.01)
(52) U.S. Cl. .................. 362/494; 362/487; 362/511
(58) Field of Classification Search ............... 362/494, 362/540, 511, 545, 487
See application file for complete search history.

(56) References Cited

U.S. PATENT DOCUMENTS 6,637,917 B2 *  10/2003  Schwanz et al. ............ 362/487
6,932,497 B1 *  8/2005  Huang ........................ 362/494

* cited by examiner

*Primary Examiner*—Jong-Suk (James) Lee
*Assistant Examiner*—Robert May
(74) *Attorney, Agent, or Firm*—Reising Ethington Barnes Kisselle, P.C.

(57) ABSTRACT

An external rear view mirror for vehicles includes a mirror head the is fixedly secured to the vehicle. A housing defines an opening and a housing rear wall. The housing rear wall defines a recess that extends along a portion thereof. A turn-signal lamp, designed to generate light, is fixedly secured to the housing rear wall. The turn-signal lamp extends into the recess. The turn-signal lamp includes a light lens that covers the turn-signal lamp. The light lens has an outside surface. The external rear view mirror also includes an optical waveguide that guides the light generated by the turn-signal lamp around the mirror head, whereby the optical waveguide is fixedly secured to the light lens.

9 Claims, 2 Drawing Sheets

OUTSIDE REAR VIEW MIRROR

BACKGROUND ART

1. Field of the Invention

The invention relates to an outside rear view mirror of vehicles. More particularly, the invention relates to outside rear view mirrors having turn-signal lamps secured thereto.

2. Description of the Related Art

External rear view mirrors having repeater turn-signal lamps are known. These lamps are inserted into the housing as lamp units. Using the optical waveguide technology, light is conducted to a decoupling point, at which the light escapes outward. This technology allows a portion of the emitted light, that is generally directed outwardly toward the front of a vehicle, to be directed in another direction, either to signal to those rearward of the vehicle or the operator of the vehicle.

SUMMARY OF THE INVENTION

An external rear view mirror for vehicles includes a mirror head the is fixedly secured to the vehicle. A housing defines an opening and a housing rear wall. The housing rear wall defines a recess that extends along a portion thereof. A turn-signal lamp, designed to generate light, is fixedly secured to the housing rear wall. The turn-signal lamp extends into the recess. The turn-signal lamp includes a light lens that covers the turn-signal lamp. The light lens has an outside surface. The external rear view mirror also includes an optical waveguide that guides the light generated by the turn-signal lamp around the mirror head, whereby the optical waveguide is fixedly secured to the light lens.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS(S)

Figure 3:
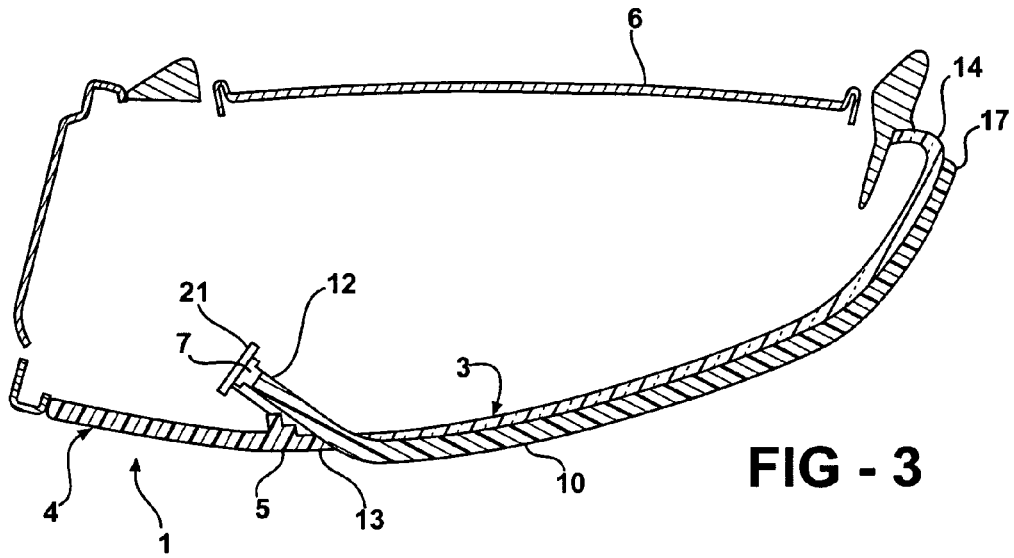
FIG. 3 is a cross-sectional view taken along lines 3-3 of FIG. 1.

The external rear view mirror is attached in a known way using a mirror base (not shown) to a vehicle, preferably a motor vehicle. A mirror head 1 is mounted on the mirror base, which may be pivoted in relation to the mirror base in and against the travel direction of the vehicle. A lamp unit 2, which is formed in the exemplary embodiment by a repeater turn-signal lamp, is housed in the mirror head 1 at a distance from the mirror base. The lamp unit 2 has a light lens 3 defining an outside surface 15, through which the light of the lamp unit 2 escapes to the outside. The mirror head 1 has an adjustable mirror glass support (not shown), which is housed in a housing 4 of the mirror head 1. The housing 4 encloses an opening, in which a mirror glass 6 lies (FIG. 3). The mirror glass 6 is attached to the mirror glass support.

Figure 4:
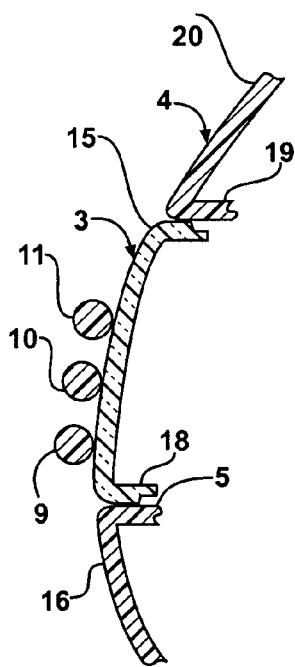
FIG. 4 is a cross-sectional side view, partially cut away, taken along lines 4-4 of FIG. 1.

On the back, the housing 4 is provided with a recess 5, into which the light lens 3 is inserted. The recess 5 is halfway up the housing 4 and extends in an outward direction from approximately the midway point of the mirror housing 4. The outer end 14 of the light lens 3, facing away from the mirror base, is drawn around the housing 4 enough so that the light lens 3 extends almost to the edge of the housing 4 around an edge of the mirror glass 6 of the external rear view mirror. The light lens 3 fills up the recess 5 completely. The outside 15 of the light lens 3 advantageously forms a continuous extension of the outside 16 of a rear wall 20 of the housing 4 (FIGS. 3 and 4). More specifically, the light lens 3 extends through substantially the same contour as the majority of the housing rear wall 20. The edge 18 of the light lens 3 is bent over approximately perpendicularly and presses against an edge 19 of the housing rear wall 20, which is bent over approximately perpendicularly and delimits the recess 5.

The edge 18 of the light lens 3 is attached in a suitable way to the edge 19 of the housing rear wall 20, for example, glued, welded, and the like. The light lens 3 is fabricated from light-transparent material, preferably an appropriate plastic. At least one light source (not shown) may be provided behind the light lens 3, whose light is emitted outward through the light lens 3.

The lamp unit 2 has three optical waveguides 9 through 11 lying parallel to one another in the exemplary embodiment. These optical waveguides 9-11 are pressed against the outside surface 15 of the light lens 3 over the majority of their lengths. The optical waveguides 9 through 11 preferably have a circular cross-section. The optical waveguides 9 through 11 pass diagonally and inwardly into the housing 4 through the light lens 3 near the edge 13 facing toward the mirror base (FIG. 3). A light source 7, preferably an LED, is located a source end 12 of each of the optical waveguides 9 through 11. The LEDs 7 are seated on a circuit board 21, which is held in a suitable way in the housing 4. The LEDs 7 are situated and implemented in such a way that the light emitted thereby reaches the front or distal end of the optical waveguides 9 through 11.

Figure 1:
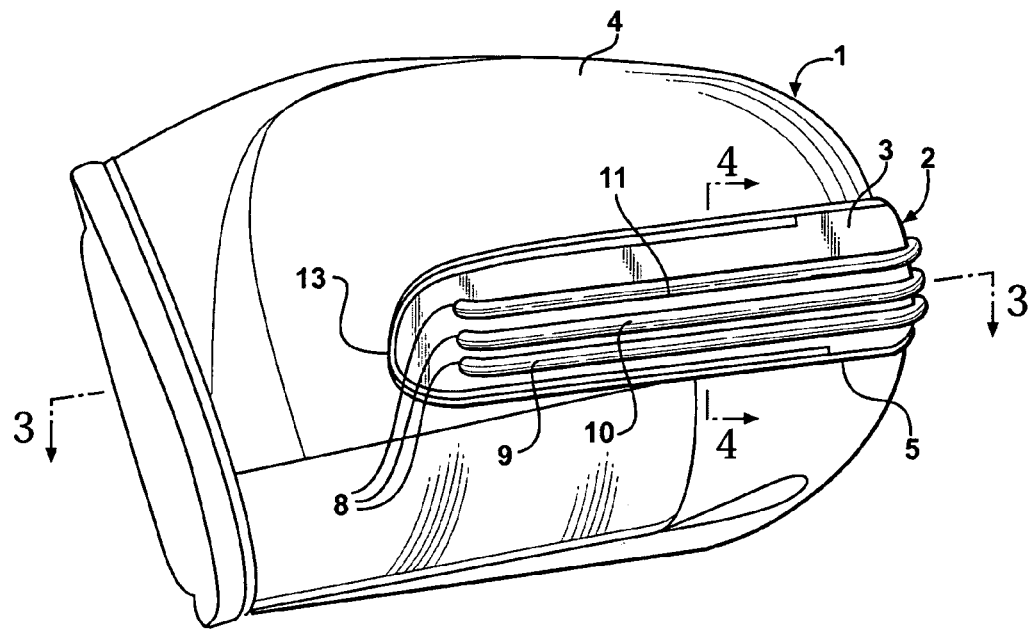
FIG. 1 is a perspective view of a part of a lamp unit housed in a mirror head of an external rear view mirror according to the invention.
Figure 2:
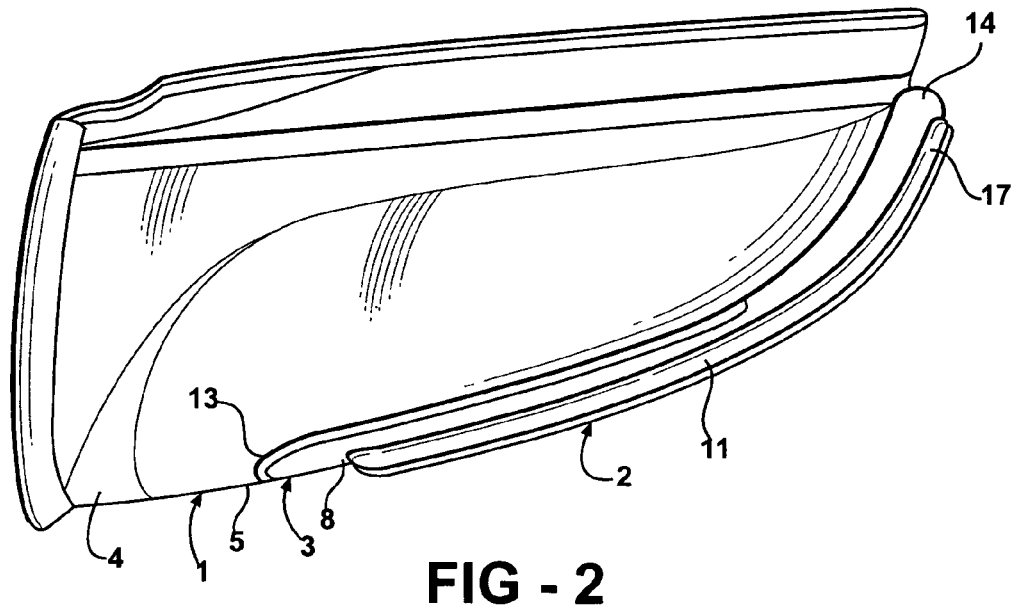
FIG. 2 is a top view of the lamp unit of from FIG. 1.

The optical waveguides 9 through 11 extend up to the end of the light lens 3 facing away from the mirror base (FIGS. 2 and 3). At this end 17, the optical waveguides 9 through 11 are provided with a decoupling optic, which ensures that the light escapes outward from the optical waveguides 9 through 11. The optic is provided in such a way that light is directed diagonally outward and forward in the travel direction of the motor vehicle.

Notwithstanding the exemplary embodiment shown, the optical waveguides 9 through 11 may also be implemented as shorter, depending on where the suitable point for the light exit is, in order to illuminate the legally required area. The optical waveguides 9 through 11 may also have different lengths and be situated next to one another in such a way that they lie staggered next to one another.

The optical waveguides 9 through 11 have identical circular sections in the exemplary embodiment. However, they may also have non-round cross-sections, such as oval, trapezoidal, or similar cross sections. The cross-sections may also be different and/or only different sizes.

The optical waveguides 9 through 11 may be implemented in one piece with the light lens 3. Of course, only one or two optical waveguides or even more than three optical waveguides may be provided; they may also have different distances from one another and/or from the longitudinal edges of the light lens 3. The optical waveguides 9 through 11 may also be separate parts from the light lens, which are attached permanently to the outside 15 of the light lens 3. In this case, the light lens is provided with passage openings 8 for the passage of the optical waveguides 9 through 11. The passage points are sealed, so that no moisture, dirt, or the like may penetrate into the lamp unit 2.

Figure 5:
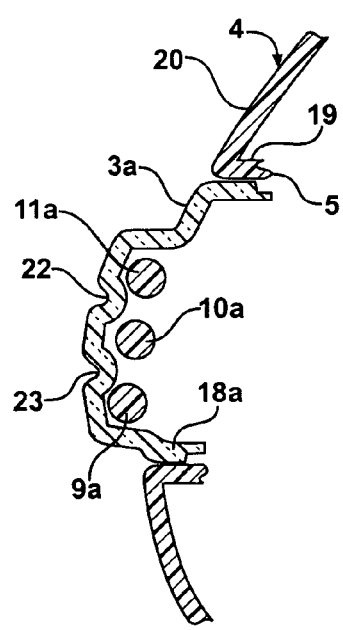
FIG. 5 is a first alternative embodiment of the light lens and the optical waveguide.

In the embodiment shown in FIG. 5, three optical waveguides 9a through 11a, which extend in the longitudinal direction of the light lens 3a and are positioned at equal distances from one another, are also provided. The light lens 3a projects beyond the outside 20 of the housing 4 in the area of the optical waveguides 9a through 11a. In the area between optical waveguides 9a through 11a, the light lens 3a is provided with groove-like depressions 22, 23, which partially project into the area between neighboring optical waveguides 9a through 11a. They lie in the area in front of the outside 20 of the housing 4. The light lens 3a is implemented as V-shaped in cross-section in the area above and below the optical waveguides 9a through 11a.

Furthermore, the bent-over edge 18a of the light lens 3a is attached to the bent-over edge 19 of the recess 5. Optical waveguides 9a through 11a are implemented and situated identically as in the previous embodiment.

Figure 6:
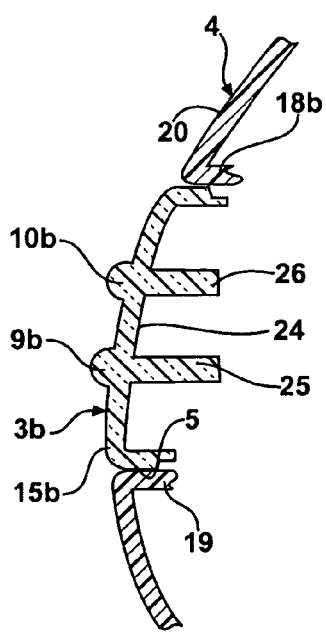
FIG. 6 is a second embodiment of the light lens and the optical waveguide.

FIG. 6 shows an embodiment in which the light lens 3b and the optical waveguides 9b, 10b are implemented in one piece with one another. In this exemplary embodiment, only two optical waveguides 9b, 10b are provided. Only one optical waveguide or further optical waveguides may also be provided. They have a semicircular cross-section, but may also have any other suitable cross-sectional shape. The optical waveguides 9b, 10b project beyond the outside 15b of the light lens 3b. The outside 15b of the light lens 3b advantageously forms a continuous extension of the outside 20 of the housing 4.

Webs 25, 26, which are preferably implemented in one piece with the light lens 3b and advantageously have equal lengths, extend from the bottom 24 of the light lens 3b at the level of the optical waveguides 9b, 10b. The webs 25, 26 extend toward the light source within the lamp unit 2. In order to ensure simple production, the light lens 3b, the optical waveguides 9b, 10b, and the webs 25, 26 are produced from the same material. The light lens 3b has the bent-over edge 18b, using which it is attached to the bent-over edge 19 of the recess 5 in the way described. In a further embodiment (not shown), the optical waveguides pass outward through openings in the housing 4.

A background lamp, a heater for the mirror glass 6, a loudspeaker, a camera, a GPS module, sensors for automatic dimming of the mirror glass 6 and/or the mirror glass of the internal rear view mirror of the motor vehicle, an antenna, and the like may be housed in the mirror head in arbitrary combinations.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

The invention claimed is:

1. An external rear view mirror for vehicles, said external rear view mirror comprising:
   a mirror head fixedly secured to the vehicle;
   a housing defining an opening and a housing rear wall, said housing rear wall defining a recess extending along a portion thereof;
   a turn-signal lamp for generating light, said turn-signal lamp fixedly secured to said housing rear wall and extending into said recess, said turn-signal lamp including a light lens covering said turn-signal lamp and defining an outside surface and an opening extending through said light lens; and
   an optical waveguide having a source portion end extending through said opening in said light lens for guiding the light generated by said turn-signal lamp outside said light lens and around said mirror head, said optical waveguide having a remaining portion fixedly secured to said outside surface of said light lens.

2. An external rear view mirror as set forth in claim 1 including a light source disposed adjacent said source end of said optical waveguide to emit light to be received by said optical waveguide.

3. An external rear view mirror as set forth in claim 2 wherein said optical waveguide defines a distal end.

4. An external rear view mirror as set forth in claim 3 including an optical decoupler fixedly secured to said distal end to allow the light to exit said optical waveguide.

5. An external rear view mirror as set forth in claim 4 wherein said distal end is wrapped around a portion of said housing.

6. An external rear view mirror as set forth in claim 5 including a plurality of optical wave guides extending parallel to each other along said light lens.

7. An external rear view mirror as set forth in claim 6 wherein each of said plurality of optical waveguides define a length.

8. An external rear view mirror as set forth in claim 7 wherein each of said lengths is equal to each other.

9. An external rear view mirror as set forth in claim 7 wherein a portion of said lengths differs from another portion of said lengths.

* * * * *